United States Patent [19]

Frank et al.

[11] Patent Number: 4,806,520

[45] Date of Patent: Feb. 21, 1989

[54] DECOLORIZATION OF AQUEOUS SACCHARIDE SOLUTIONS AND SORBENTS THEREFOR

[75] Inventors: Dieter Frank, Naperville; Lincoln D. Metcalfe, LaGrange; John Y. Park, Naperville, all of Ill.

[73] Assignee: Akzo America Inc., New York, N.Y.

[21] Appl. No.: 171,988

[22] Filed: Mar. 23, 1988

Related U.S. Application Data

[62] Division of Ser. No. 834,941, Feb. 28, 1986, Pat. No. 4,746,368.

[51] Int. Cl.[4] .............................................. B01J 20/26

[52] U.S. Cl. ...................................... 502/402; 502/404

[58] Field of Search .................. 502/402, 404; 127/55, 127/46.2, 46.3, 48; 210/660, 670

[56] References Cited

U.S. PATENT DOCUMENTS

| | | | |
|---|---|---|---|
| 3,698,951 | 10/1972 | Bennett | 127/48 |
| 3,806,364 | 4/1974 | Gasco | 127/48 |
| 3,834,541 | 9/1973 | Rundell et al. | 210/219 |
| 4,523,959 | 6/1985 | Exertier | 127/46.2 |
| 4,572,742 | 2/1986 | Kunin et al. | 127/55 |
| 4,746,368 | 5/1988 | Frank et al. | 502/402 |

*Primary Examiner*—H. M. S. Sneed
*Assistant Examiner*—Chung K. Pak
*Attorney, Agent, or Firm*—Louis A. Morris

[57] ABSTRACT

The invention is a process for the removal of impurities comprising phenolics, dextrans or amino nitrogen from an aqueous saccharide solution. The solution is contacted with a sorbent, which itself is also an embodiment of the invention, comprising a cationic nitrogenous surfactant, the molecules of which contain at least one alkyl group of at least 8 carbon atoms, deposited on the surface of a microporous hydrophobic polymeric support. The deposition is accomplished by contacting a solution of the surfactant in an appropriate solvent with the support. The impurities are adsorbed onto the sorbent and the aqueous saccharide solution is removed from contact with the sorbent. The solvent must be completely miscible with the saccharide solution and the solution of the surfactant in the solvent must have a maximum sorbent wetting rate of at least 100 $g/m^2 \cdot min.$, and a sorbent bed retention of at least 140%, based on the bed interstitial volume. The partitioning coefficient of the impurities in the surfactant and solvent deposited on the support, as compared to in water, must be at least 20.

The process is extremely effective in removing impurities from saccharide solution having very high concentrations of impurities, and at very high flow rates.

13 Claims, 2 Drawing Sheets

DECOLORIZATION OF AQUEOUS SACCHARIDE SOLUTIONS AND SORBENTS THEREFOR

This is a division of application Ser. No. 834,941 filed Feb. 28, 1986, now U.S. Pat. No. 4,746,368.

BACKGROUND OF THE INVENTION

The field of art to which this invention pertains is the solid-bed adsorptive separation of impurities from an aqueous saccharide solution. More specifically the invention relates to a process for separating certain impurities from an aqueous saccharide solution which process employs a sorbent comprising a long chain alkyl cationic surfactant deposited on a hydrophobic microporous polymeric support which selectively adsorbs the impurities from the solution. The invention also relates to the sorbent composition itself.

Sugar producing processes, whether they are based on sugar beets, sugar cane or hydrolyzed corn starch as sources of sugar, all have in common an intermediate process stream comprising an aqueous saccharide solution which contains various impurities. The exact nature and amount of such impurities will vary from process to process, but generally they comprise phenolics, dextrans, amino nitrogen containing compounds and various other color bodies. The phenolics may account for up to 90% of the color bodies. It is necessary that these impurities be removed in order to obtain a high quality sugar product fit for human consumption.

A long used method for removing impurities from sugar solutions employs particles of activated carbon. The sugar solution or syrup is forced through a bed of such particles maintained in a vessel such as a column. Unfortunately, there are many disadvantages to such use of activated carbon, including (1) the high cost and complexity of regeneration which must be carried out by unloading the carbon from the vessel in which it is used, placing it in a kiln in which the impurities are burned off and reloading the carbon into the vessel; (2) the loss of sugar which adheres to the activated carbon and is destroyed during regeneration; (3) the slow rates obtainable (1-3 bed volumes/hour) of the sugar solutions through the activated carbon; and (4) certain limitations of activated carbon to deal with a high color loading (greater than 2,000 ICU) in the aqueous sugar feedstream.

More recently, various processes have been developed which employ ion exchange resins for the purification of aqueous sugar solutions. The process of U.S. Pat. No. 3,982,956 to Schoenrock et al treates impure sugar juice that has already undergone a two-stage carbonation, by first passing it through a cation exchange resin and then through an ion exchanger having a tertiary amine functionality, and regenerating the anion exchanger with an ammonium hydroxide solution. The process of Belgium Pat. No. 846,174 decolorizes sugar solutions first by precipitation of impurities with calcium hydroxide and phosphoric acid, followed by passing the solution over cation and anion ion exchange resins which contain 5% of a macroreticular absorbing porous resin or polymer. Japanese Patent Publication JP No. 77059722 (Abstract No. 453564) discloses decolorizing a sugar solution by contacting it with a conjugate fiber of one component made from an ion exchange polymer reinforced by a second component comprising a polymer such as poly-2-olefin. The publication "Cane Sugar Decolorization By Ion Exchange Resins", *Sugar Industrial Technology,* 1982, Vol. 41, discusses the use of quaternary ion exchange resins to remove the color bodies from sugar syrup passed through the resin at the rate of about 3 bed volumes/hour, and the use of NaCl brine for regeneration of the resin.

U.S. Pat. No. 4,196,017 to Melville et al teaches a method for reducing color impurities in sugar syrups by a multi-step process. First, a bleach is added to the syrup. Second, a cationic surfactant, such as a long hydrocarbon chain quaternary ammonium compound, is added. Third, a defecant such as calcium chloride is added. Finally, the solids are filtered out of the syrup and a purified sugar syrup is obtained.

The article "Adsorption of Organic Compounds from Water with Porous Poly(tetrafluorethylene)", *Anal. Chem.,* 1984, 56, 764–768 discusses the use of Teflon in column chromatography for the adsorption of varius solutes from water.

The present invention relates to the removal of impurities from an aqueous saccharide solution, but, in a manner not known to the prior art, employs a long hydrocarbon chain cationic surfactant deposited on a porous hydrophobic polymeric support, and, in contrast to the methods of the prior art, the present invention is capable of purifying aqueous saccharide solutions having very high levels of impurities, and, for a given volume of sorbent, is capable of a very high throughput of solution.

SUMMARY OF THE INVENTION

Accordingly, the broad objectives of the present invention are to provide a process for removing impurities from a saccharide solution as well as a unique sorbent for use in such process.

In brief summary, the invention is, in one broad embodiment, a process for the removal of impurities comprising phenolics, dextrans or amino nitrogen from an aqueous saccharide solution comprising contacting the solution with a sorbent comprising a cationic nitrogenous surfactant, the molecules of which contain at least one alkyl group of at least 8 carbon atoms, deposited on the surface of a microporous hydrophobic polymeric support. The deposition is effected by contacting a solution of the surfactant in an appropriate solvent with the support. The impurities are adsorbed onto the sorbent, and the aqueous saccharide solution is then removed from contact with the sorbent. The solvent is required to be completely miscible with the saccharide solution, the solution of the surfactant in the solvent must have a maximum sorbent wetting rate of at least 100 $g/m^2$. min, and the sorbent bed retention of the solution must be at least about 140%, based on the bed interstitial volume. The partitioning coefficient of the impurities in the surfactant and solvent phase deposited on the support, as compared to in water, must be at least 20.

In a second broad embodiment, the present invention is a sorbent suitable for the removal of impurities comprising phenolics, dextrans and amino nitrogen from an aqueous saccharide solution comprising a nitrogenous surfactant, the molecules of which contain at least one alkyl group of at least 8 carbon atoms, deposited on the surface of a microporous hydrophobic polymeric support. The deposition is effected by contacting a solution of the surfactant in an appropriate solvent with the support. The solvent must be completely miscible with the saccharide solution, the solution of the surfactant solvent must have a sorbent wetting rate of at least 100

$g/m^2$.min., and the sorbent bed retention of the solution must be at least 140%, based on the bed interstitial volume. The partitioning coefficient of the impurities in the surfactant deposited on the support, as compared to in water, must be at least 20.

In a third embodiment, the present invention comprises a process for the removal of impurities comprising phenolics, dextrans or amino nitrogen from an aqueous saccharide solution. The solution is contacted with a sorbent comprising a quaternary ammonium salt of the formula:

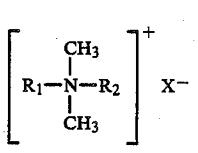

where $R_1$ and $R_2$ each independently comprises an alkyl group of from 8 to 18 carbon atoms and $X^-$ is chloride or methylsulfate. The quaternary ammonium salt is on the surfce of a microporous hydrophobic polymeric support. The impurities are adsorbed onto the sorbent. The aqueous saccharide solution is then removed from contact with the sorbent.

In a fourth embodiment, the present invention comprises a sorbent suitable for the removal of impurities comprising phenolics, dextrans and amino nitrogen from an aqueous saccharide solution comprising a quaternary ammonium salt of the formula:

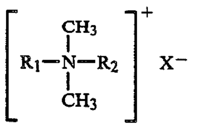

where $R_1$ and $R_2$ each independently comprises an alkyl group of from 8 to 18 carbon atoms and $X^-$ is chloride or methylsulfate. The quaternary ammonium salt is on the surface of a microporous hydrophobic polymeric support.

Other embodiments of the present invention encompass details about particular surfactants, solvents and support materials, all of which are hereinafter disclosed in the following discussion of each of the facets of the invention.

DESCRIPTION OF THE INVENTION

The support of the sorbent of the present invention is a microporous hydrophobic polymeric material. The polymer selected must be a microporous (about 0.1-50 micron average pore diameter) synthetic hydrophobic thermoplastic polymer selected from the group consisting of aliphatic olefinic polymers, oxidation polymers, ionic polymers and blends thereof. Polypropylene and polyethylene are examples of nonionic polymers. The binding of the surfactant and solvent phase to the nonionic polymers is by hydrophobic adsorption. A minimum hydrobicity is essential for the polymers to be used. Nonionic polymers effective for the present invention, and having a sufficient degree of hydrophobicity, are considered to be those having a surface tension less than 41 dynes/cm which includes polyethylne and polypropylene. For the ionic polymers, e.g. Surlyn®, the surface tension of the polymer may no longer be a relevant parameter, and in those cases the term "hydrophobic" may have its commonly understood meaning as defined in *Hackh's Chemical Dictionary,* 4th Edition, i.e. a substance that does not adsorb or absorb water. The term "saccharide" as used herein is intended to include simple sugars as well as combinations of sugars and polymerized sugar.

The ideal microporous structure for the polymeric supports and method of obtaining such structure are as disclosed in U.S. Pat. Nos. 4,247,498 and 4,519,909 issued to Castro, both incorporated by reference herein in their entirety. Those patents disclose microporous cellular polymer structures known by the trademark Accurel® which are marketed by Enka America Incorporated, 1827 Walden Office Square, Suite 480, Schaumburg, Ill. 60195. Accurel® structures may be characterized in one of three ways:

1. a cellular microporous structure which comprises a plurality of substantially spherical cells having an average diameter from about 0.5 to about 100 microns, distributed substantially uniformly throughout the structure, adjacent cells being interconnected by pores smaller in diameter than the microcells, the ratio of the average cell diameter to the average pore diameter being from about 2:1 to about 200:1, the pores and the cells being void.
2. A cellular microporous structure which is cellular and is characterized by a C/P ratio of from about 2 to about 200, an S value of from about 1 to about 30, and an average cell size from about 0.5 to about 100 microns.
3. An isotropic microporous structure that is characterized by an average pore diameter of from about 0.1 to about 5 microns and an S value of from about 1 to about 10.

In numbers 2 and 3 above "C" means average diameter of cells, "P" the average diameter of the pores, and "S" is the sharpness factor, determined by use of a Micromeritics Mercury Penetration Porosimeter, and defined as the ratio of the pressure at which 85 percent of the mercury penetrates the structure to the pressure at which 15 percent of the mercury penetrates.

Possible surfactants to be deposited on the surface of the above polymeric support to obtain the sorbent of the instant invention are cationic nitrogenous compounds having molecules which contain at least one carbon chain group of at least 8 carbon atoms. The term "cationic" is intended to mean not only quaternary ammonium compounds which actually exist as cations, but also various amines that have a cationic effect. The term "nitrogenous" is intended to mean a molecule incorporating at least one of a primary secondary or tertiary amine or molecule comprising a quaternary ammonium salt. Examples of suitable surfactants are the N-alkylpropylene diamines: N-coco-1,3-diaminopropane, N-tallow-1,3-diaminopropane, N-oleyl-1,3-diaminopropane and N-soya-1,3-diaminopropane. Those diamines are marketed under the trademark Duomeen® by Akzo Chemie America, 300 South Wacker Drive, Chicago, Ill. 60606.

The quaternary ammonium salts suitable as surfactants for the present invention are of the formula:

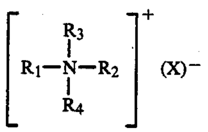

where $R_1$ is selected from the group comprising hydrocarbons containing from 8 to about 24 carbon atoms per molecule, $R_2$ is selected from the group comprising hydrocarbons containing from 1 to about 18 carbon atoms per molecule or the alcohols thereof, $R_3$ and $R_4$ are independently selected from the group comprising $CH_3$— or $(CH_2CH_2)_nH$— where n for both $R_3$ and $R_4$ totals from 2 to 50, and X is any anion that forms a stable salt with the quaternary cation, preferably a halogen or methylsulfate. One group of such quaternary ammonium salts are the alkyltrimethyl-ammonium chlorides, where $R_1$ of the above formula is the alkyl-group, such as a tallow hydrocarbon. These monoalkyl long chain quaternary ammonium surfactants have been found to be effective for use in the process of the present invention when the solvent selected is ethanol. Regeneration of a sorbent utilizing these latter surfactants, i.e. a sorbent that has adsorbed substantial amounts of impurities from a saccharide solution and for that reason has a diminished ability to further remove impurities, may be accomplished by first flushing the sorbent with ethanol, and then flushing with water, and finally contacting the sorbent with a fresh surfactant solution.

The most preferred quaternary ammonium salts for use as surfactants in the process of the present invention, however are the dialkyl long chain quaternary ammonium salts. Particularly preferred salts, with reference to the above formula, are where $R_1$ comprises an alkyl group of from 8 to 18 carbon atoms, $R_2$ is 2-ethylhexyl, $R_3$ and $R_4$ are methyl and X is chloride or methylsulfate. These salts may be deposited on the support with water as the solvent and the resulting sorbent will be highly effective for removing impurities from saccharide solutions. The sorbent may be regenerated by flushing the sorbent first with an aqueous solution of sodium chloride and sodium hydroxide and then with water, and finally contacting the sorbent with a fresh surfactant solution.

The above discussed quaternary ammonium chlorides are marketed under the trademark Arquad® by Akzo Chemie America. If polyethoxylated, the quaternary ammonium salts are marketed under the trademark Ethoquad®.

In the most preferred embodiment of the present invention, the surfactant is deposited onto the surface of the support by contacting a solution of the surfactant in an appropriate solvent with the support, such as by passing such solution through a bed of support particles. By "deposited onto the surface" it is meant that the surfactant is deposited throughout the porous structure of the microporous polymeric support, but not necessarily within the morphology, i.e. molecular network, of the polymer itself. The concentration of surfactant in solvent may range from about 0.1 wt. % to about 25 wt. %, but, optimally, is considered to be from about 0.5% to about 5.0%.

Notwithstanding the preference for depositing the surfactant on the support by means of an appropriate solvent, however, the aforementioned dialkyl long chain quaternary ammonium salts have been found so effective, regardless of the solvent employed, that it is believed there is no criticality to the means by which those particular salts are placed on the surface of the support. Thus, for example, rather than employing a solvent, the support might be dipped in pure liquid dialkyl long chain quaternary ammonium salt, the excess liquid allowed to drain off and the resulting sorbent used directly in the process. Other such means of placing the dialkyl long chain quaternary ammonium salt surfactant on the support might not be as convenient as by use of a solution of the surfactant, but there is no compelling need with regard to the surfactant for the present invention to be limited to any particular means.

On the other hand, it should be emphasized that the use of solvents for depositing surfactants on supports is preferred where the nature of the surfactant permits its use. An advantage to the use of water as a solvent is that the aqueous saccharide solution chargestock may itself serve as the solvent for the surfactant, rather than pure water, which would preclude dilution of the product during initial operation of the process.

It is contemplated that the process of the present invention will best be carried out by means of at least one column packed with particles of the sorbent, with the aqueous saccharide solution being continuously passed through the column. There may be parallel columns and/or multiple packed columns in series with the saccharide solution being passed upwardly through each column in the series. The optimum size of sorbent particles, at least as determined by bench scale experimentation, is from about 30 to about 1150 μm in diameter. It was also determined that for certain purposes, as where the chargestock has a high degree of turbidity, it would be preferred to have at least three of such columns with all but the last downstream column in the series having sorbent of particle size of about 250 to about 450 μm in diameter, and the sorbent in the last column of from about 30 to about 210 μm.

Reaction conditions for practice of the process of the present invention as well as for depositing the surfactant on the support are not critical and may be considered to be ambient temperature and pressure, or whatever temperature and pressure may be considered convenient in view of the particular circumstances. It has been found, however, that it is most advantageous for the pH of the saccharide solution to range from about 6.5 to about 8.5

To particularly point out and distinctly claim the present invention, experimental determinations were made of various parameters relevant to whether a particular surfactant and solvent solution would be efficacious in producing a sorbent effective in removing impurities from an aqueous saccharide solution. It was first found that the solvent used must be completely miscible in the saccharide solution being purified, and, of course, the surfactant must be soluble in the solvent at the desired concentration. Other parameters, as will be defined and described in appropriate detail below, were determined to be sorbent wetting rate, sorbent bed retention of surfactant and solvent solution and the partitioning coefficient of the impurities in the surfactant and solvent deposited on the support, as compared to in water. Definitions and empirical determinations for each such parameter are set forth in the following examples.

The following example presents the results of testing of a wide variety of different types of materials comprising supports for sorbents used for the decolorization of an impure sugar solution. In all of the examples the sugar solution was that of cane sugar.

EXAMPLE I

A series of test runs were carried out with a cationic surfactant (unless stated otherwise) comprising Arquad® TL8, which is tallow-2 ethyl-hexyl-dimethyl ammonium chloride, deposited on various supports to make different sorbents. The supports, which were powdered, were packed into a glass column of 2.22 cm I.D. to form a bed volume of 33 $cm^3$. The surfactant for each test (unless as stated otherwise below) was loaded in situ on the support by pouring 40 ml of a 3 wt. % aqueous solution of the surfactant in the top of the column and allowing the solution to drain through the bed.

For each test run 14.5 B.V. (bed volumes) of 30 wt. % sugar solution of 2872 ICU color was passed downflow through the column at room temperature and pressure. The units ICU are international units of color and are a measure of the amount of light of 420 nanometer wavelength that is able to pass through the solution. Since up to 90% of the color bodies in a raw sugar solution may be phenolics, it is possible to make a rough correlation of color units in a sugar solution to phenolic content of the solution of 7.75 ICU=1 ppm phenolics.

The results of test runs are as shown in the following Table 1:

TABLE 1

| Support | Flow Rate B.V./Hr. | Color Removal % | Decolorized Solution Appearance |
|---|---|---|---|
| Polypropylene Accurel ®* | 3 | 80.0 | Clear |
| Polypropylene Accurel ®* | 27 | 75.0 | very slightly turbid |
| Porous Sand | 27 | 2.0 | turbid |
| Boiling Chips | 27 | 4.0 | turbid |
| Activated Carbon | 27 | 51.0 | turbid |
| Molecular Sieves | 27 | 21.0 | turbid |
| Ion Exchange Resin (IRA 900**) | 27 | 81.7 | very turbid |
| Ion Exchange Resin (IRA 900) without surfactant | 27 | 35.0 | turbid |
| Ion Exchange Resin (IRA 900) without surfactant | 3 | 77.5 | slightly turbid |
| Ion Exchange Resin (Amberlite MB-1***) | 27 | 37.2 | turbid |

*250–450 μm particle size
**Rohm and Haas cationic polystyrene ion exchange resin
***Rohm and Haas cationic and anionic polystyrene ion exchange resin.

The data of Table 1 illustrates the unique ability of the cationic nitrogenous surfactant on a microporous hydrophobic polymeric support (Accurel®) to achieve high color removal at low or high feed flow rates and at the same time a clear product. The product turbidity which was always observed when ion exchange resins were employed particularly at high flow rates, is believed to consist of various gums, dextrans, etc.

EXAMPLE II

In this example the same test equipment, method of surfactant loading and operating procedures as in Example I were employed, and for each test run the support used was the polypropylene Accurel® of 250–450μ diameter particle size. What varied between the runs was the combination of surfactant used and the solvent employed to deposit the surfactant on the support via 40 ml. of a solution of the solvent in question containing 3 wt. % of the surfactant. The following Table 2 gives the results of the test runs.

TABLE 2

| Surfactant | Solvent | % Color Removal |
|---|---|---|
| Dry Accurel ® (no surfactant) | — | 0.0 |
| Accurel with ethanol (no surfactant) | Ethanol | 26.0 |
| Arquad ® T-50 (tallow trimethylammonium chloride) | Ethanol | 70.0 |
| Arquad ® T-50 | Water | 20.0 |
| Arquad ® TL8-50 (dimethyl-tallow-2ethylhexyl ammonium chloride) | Water | 75.0 |
| Arquad ® TL8-50 | Ethanol | 76.0 |
| Arquad ® 2HT-75 (dimethyl-di(hydrogenated-tallow) ammonium chloride) | Ethanol | 68.0 |
| Arquad ® 2HT-75 | Water | No results (solvent-surfactant incompatibility) |
| Arquad ® L8 (trimethyl-2-ethylhexyl ammonium chloride) | Ethanol | 45.0 |
| Duomeen ® T (N—tallow-1,3-diaminopropane) | Ethanol | 69.0 |
| Ethomeen ® T12 (bis(2-hydroxyethyl) tallow-amine) | Ethanol | 44.0 |
| Duomeen ® L8 (N—2 ethylhexyl-1,3 diaminopropane) | Water | 49.0 |
| Ethoquad ® C/25 (dimethyl-polyoxyethylene(15) cocoammonium chloride) | Water | 3.0 |
| Duomac ® T (N—tallow-1,3-diaminopropane diacetate) | Ethanol | 44.0 |
| Ethoquad ® C/12 (dimethylbis(2-hydroxyethyl)coco-ammonium chloride) | Water | 6.0 |
| Propoquad ® T/12 (methylbis (2-hydroxypropyl) tallow-ammonium chloride) | Ethanol | 64.0 |
| Ethoduomeen ® T13 (N',N',N'—tris(2hydroxyethyl)-N—tallow 1,3-diaminopropane) | Ethanol | 50.0 |
| Arquad HTL8-MS (dimethylhydrogenated tallow-2-ethylhexyl ammonium methyl sulfate) | Water | 78.3 |
| Ethoquad C/25-MS (dimethyl-polyoxyethylene(15)coco-ammonium methylsulfate) | Water | 4.5 |
| Arquad HRL8 (dimethylhydrogenated-rape-2ethylhexyl ammonium chloride) | Water | 71.6 |
| Arquad ® 1629 (trimethyl-hexadecyl-ammonium chloride) | Water | 20.9 |
| Arquad CL8-50 (dimethylhydrogenated-coco-2-ethylhexyl ammonium chloride) | Water | 80.3 |

Arquad ®, Duomeen ®, Ethoquad ®, Duomac ®, Ethoduomeen ®, and Propoquad ® are trademarks used with cationic surfactants available from Akzo Chemie America, 300 South Wacker Drive, Chicago, Illinois 60606.

Certain observations may be made from the data of Table 2. It may first be noted that all surfactant-ethanol combinations were effective for high color removal, and even ethanol alone, without surfactant, would achieve some color removal (26%). Second, the only mono-long chain alkyl surfactant-water solvent found to be reasonably effective (greater than 40% color removal) was the Duomeen ® L8. All other surfactants effective in surfactant-water solvent combinations contained quaternaries with two long chain alkyl groups.

The data obtained was then examined to identify those parameters of the various surfactant solvent combinations which, as mentioned above, would be relevant to whether a given combination would be efficacious in producing a sorbent effective in removing impurities from an aqueous saccharide solution. The immediately following examples describe the determination and quantification of such parameters.

EXAMPLE III

This example describes the experimental procedure that was developed to determine the above parameters for specific surfactant-solvent combinations and sets forth the results of such procedure. Although most studies were conducted with water and ethanol as solvents, it is believed that the parameters that were quantified would apply in determining the suitability, or lack thereof, of any solvent for use in obtaining the sorbent of the present invention or for use in the process of the present invention. For example, methanol, isopropyl alcohol and acetone were observed to be as effective as ethanol, but are far less preferred for use with food products.

TABLE 3

| Surfactant | Time to Pass Loading Solution (min) | Time to Pass First Rinse (min) | Amount Loading Solution Drained (ml) | Loading Solution Retained (ml) | Surfactant Retained After Second Flush g/g | Color Removal % |
|---|---|---|---|---|---|---|
| Water Solvent | | | | | | |
| Arquad ® CL8 | 5.63 | 16.43 | 20.8 | 19.2 | .04. | 80 |
| Arquad ® TL8 | 4.58 | 14.07 | 24.0 | 16.0 | .03 | 70 |
| Arquad ® T50 | 3.57 | 5.75 | 26.7 | 13.3 | .01 | 20 |
| Ethoquad ® C/12 | 11.90 | 12.28 | 36.4 | 3.6 | .01 | 6 |
| Ethoquad ® C/25 | 6.1* | 11.75 | 36.3 | 3.7 | .02 | 3 |
| Duomeen ® L8 | 6.0 | 39.0 | 18.2 | 21.8 | .01 | 49 |
| Arquad ® L8 | 2.78 | 2.13 | 34.7 | 5.3 | .11 | 0 |
| Ethanol Solvent | | | | | | |
| Arquad ® CL8 | 4.95 | 5.83 | 12.4 | 27.6 | .02 | 75 |
| Arquad ® T50 | 7.36 | 5.27 | 14.0 | 26.0 | .02 | 70 |
| Ethoquad ® C/25 | 5.35 | 4.98 | 13.8 | 26.2 | .02 | n.a. |
| Duomeen ® L8 | 4.92 | 5.30 | 7.6 | 32.4 | .01 | 76.2 |
| Arquad ® TL8 | 6.33 | 9.73 | 7.8 | 32.2 | .04 | 70.0 |
| Ethoquad ® C/12 | 5.21 | 4.50 | 14.7 | 25.3 | .03 | 78.7 |
| Arquad ® L8 | 10.9 | 10.08 | 14.5 | 25.5 | .17 | 54.7 |

*vacuum required

A glass column of approximately 2.22 cm I.D. was filled with a bed of 4.5 g dry Accurel ® polypropylene powder (250–450μ) yielding a bed of approximately 33 $cm^3$. This column was charged with 40 ml of 3% w/w solutions of various surfactants in water. The time for the solution to pass through the bed under gravity flow was reported as well as the amount of surfactant eluted with the liquid. Secondly, the column was rinsed with 40 ml of pure water. The amounts of eluate and surfactant were measured again. The summary of the results is given in Table 3. The times recorded for passing the loading solutions and the first water rinse are deemed inconclusive as far as a measure of wetting rate is concerned, since they do not correlate well with the % color removal previously determined. Wall effects and incomplete penetrations of the sorbent bed were probably the cause of the scatter of the data obtained. Another test was developed to more exactly determine wetting rate, as will be described in the following example, but the column tests did provide data that is an excellent measure of sorbent bed retention.

It may also be noted from the data in Table 3 that the surfactant retained on the support after two flushes is about 0.01 to about 0.04 g/g. This provides an indication of the actual amount of surfactant that remains with the support after initial operation of the process.

Sorbent bed retention, which is a measure of the affinity of the sorbent bed for the surfactant and solvent solution, is, for purposes of the present invention, defined as the maximum volume of solution comprising 3 wt. % of the surfactant in the solvent in question that will be retained in a bed of polypropylene Accurel ® powder of 250–450μ particle diameter in which the solution is allowed to flow by gravity, expressed as a percentage of the interstitial void volume of the bed. Interstitial void volume is the volume he of space between the particles as opposed to the pore volume within the particles themselves. For the Accurel ® particle bed used for the tests, the total bed volume was 33 $cm^3$, t intestitial volume 11 $cm^3$ and the particle void volume 22 $cm^3$. The calculated sorbent bed retentions (for test runs where solution retention was measured) are set forth in Table 4 as well as % color removals previously determined for the surfactant/solvent system in question.

TABLE 4

| Surfactant | Sorbent Bed Retention (%) | Color Removal (%) |
|---|---|---|
| Water Solvent | | |
| Arquad ® CL8 | 175 | 80 |
| Arquad ® TL8 | 146 | 75 |
| Arquad ® T50 | 121 | 20 |
| Arquad ® C/12 | 33 | 6 |
| Ethoquad ® C/25 | 34 | 3 |
| Duomeen ® L8 | 198 | 49 |
| Ethanol Solvent | | |
| Arquad ® CL8 | 251 | 75 |
| Arquad ® T50 | 236 | 70 |
| Ethoquad ® C/25 | 238 | n.a. |
| Duomeen ® L8 | 215 | 76.2 |
| Arquad ® TL8 | 293 | 76.0 |

On the basis of the data of Table 4, the minimum sorbent bed retention required by the invention is determined to be about 140%. A high value for such percentage is indicative of a substantial amount of the loading solution entering the void volume within the pores of the support. This is further indicative that the column bed is being wetted and such wetting is conducive to good color removal.

Another observation made concerning the above column tests was the surprising retention of ethanol solvent in the Accurel ® particle bed even after the column being flushed with an amount of water equal to the original charging volume of the ethanol. This occured regardless of which surfactant was dissolved in the ethanol. Specifically, it was found that of the original 50 gr. of ethanol charged to the column, 3.8 gr or 7.6% remained after the water flush. This is particularly surprising in view of the affinity of ethanol for water and further indicates the pronounced ability of an effective solvent and surfactant solution to wet the hydrophobic support.

As previously mentioned, it was necessary to develop another test to determine wetting rate. The description of such test and the results obtained therefrom are as set forth in the following Example IV.

EXAMPLE IV

In view of the possibility of wall effects and incomplete penetration of the Accurel® powder bed generating scatter in the wetting data, a more reliable (and easier to reproduce) test was designed using polypropylene Accurel® film of 75% porosity (75% of the film was void) and 6.8 mil (0.18 mm) thickness. Rubber o-rings were glued to the film surface using epoxy or cyanacrylate glue. The enclosed area was 97 $mm^2$ and was filled with the solution of surfactant and solvent to be tested at 1.5 to 10% concentration. Weight of the solution and time for complete absorption of the liquid were recorded. These data were converted into:

Load: mMol of cationic per $m^2$ film area

Rate: gr solution absorbed per $m^2$ per minute

BRIEF DESCRIPTION OF THE DRAWING

The data obtained for certain of the surfactant in water solutions were plotted and are shown in a graphical form in FIGS. 1 through 6.

Both good performers, Arquad® CL8 and TL8 showed a dramatic increase in wetting rate with increasing concentration of surfactant, peaking at 53 and 30 mMol/$m^2$ respectively and then dropping back following a bell shaped curve. All other cationics have either no maximum or a much less pronounced one (Arquad® T-50) and the wetting rate is far less than 20 g/$m^2$ min compared with 120 or 180 g/$m^2$ min, for TL8 or CL8 respectively. Table 5 shows load, rate and color removal for the six cationics selected for the test. On the basis of the data obtained, the wetting rate of a surfactant-solvent solution required by the present invention is at least 100 g/$m^2$.min.

Figure 1:
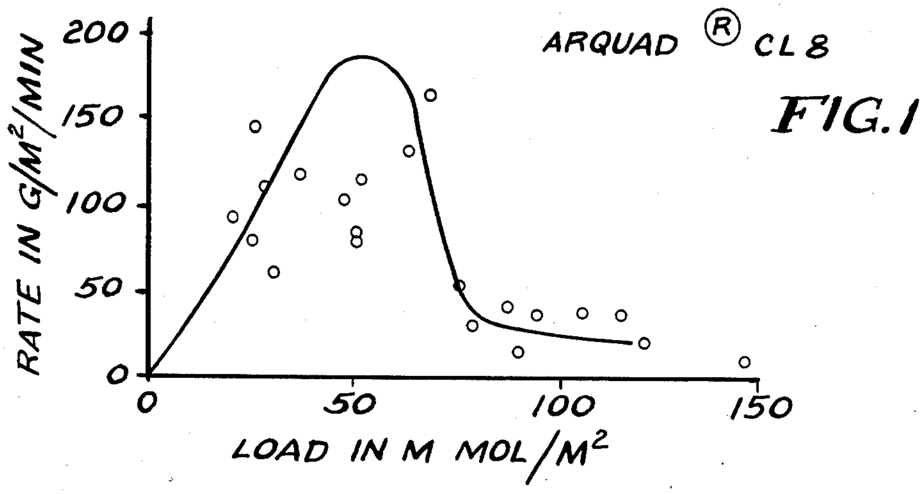
Figure 2:
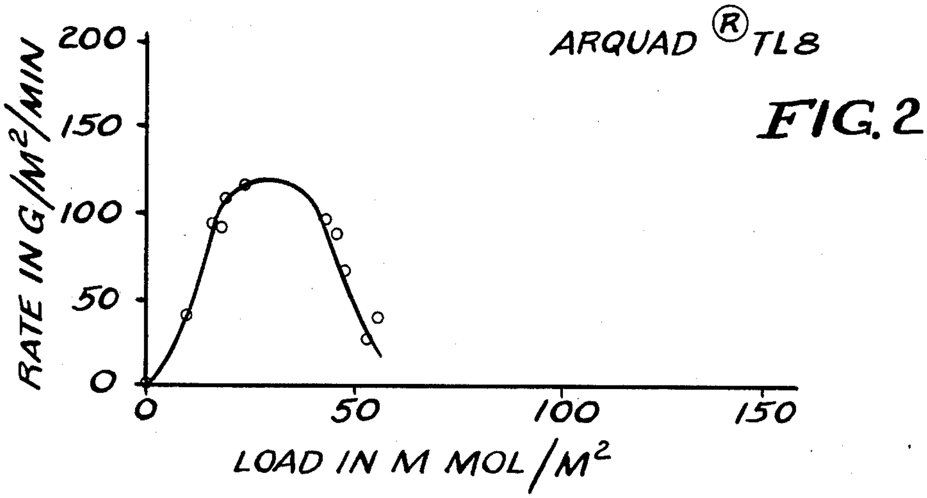
Figure 3:
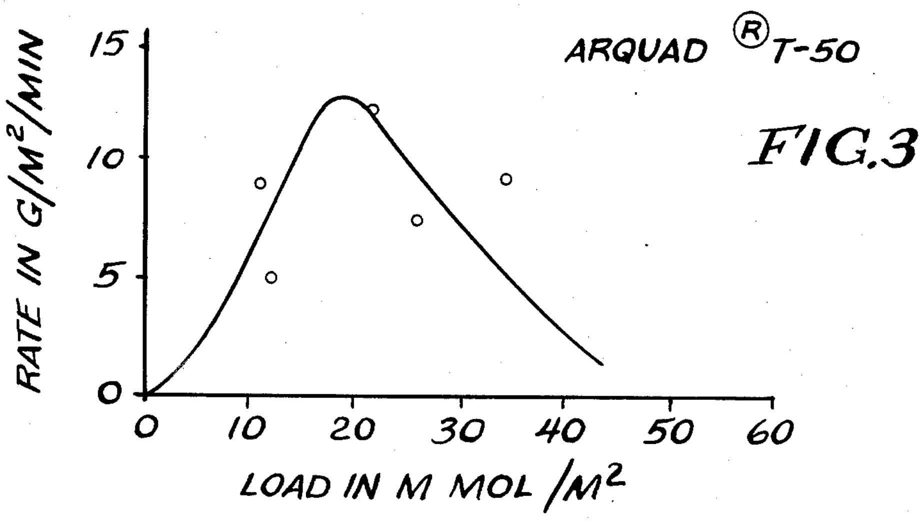
Figure 4:
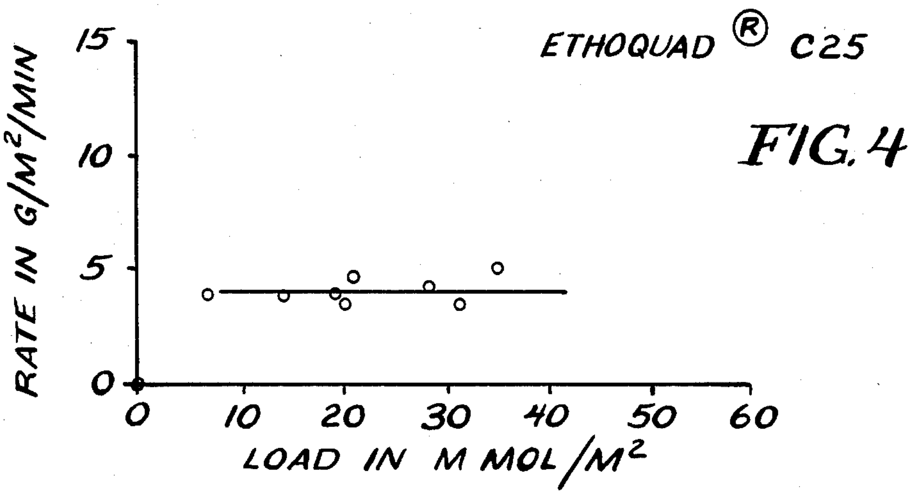
Figure 5:
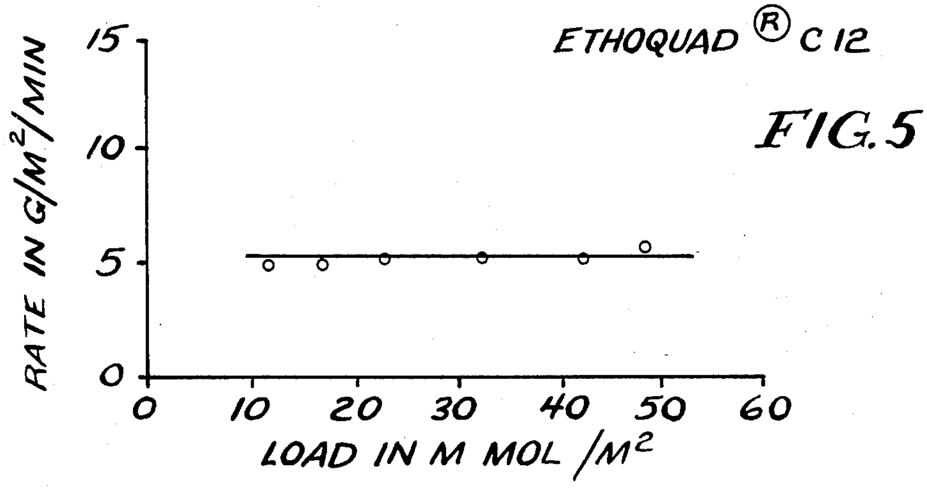
Figure 6:
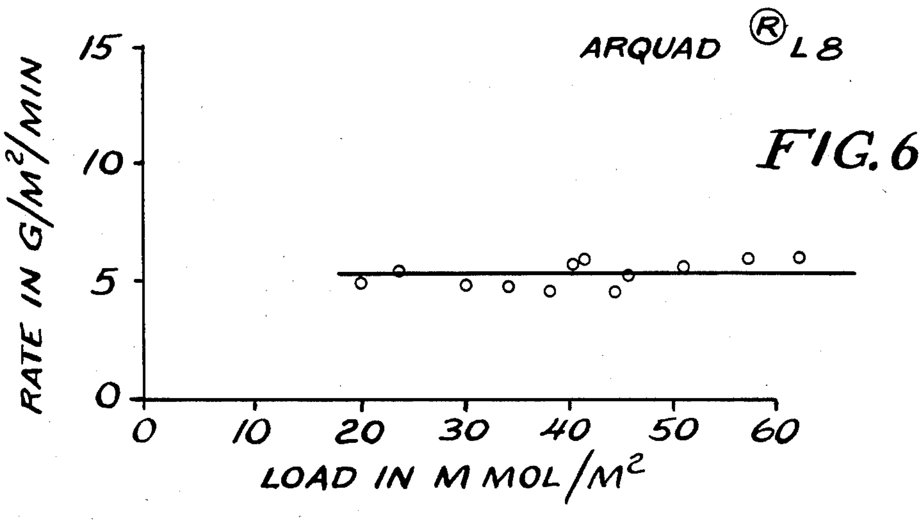

In view of the above procedure, wetting rate for purposes of the present invention, may be defined as grams of a solution of surfactant in solvent that can be completely absorbed in one minute per square meter of polypropylene Accurel® film of 75% porosity and 6.8 mil thickness.

TABLE 5

| Active | Load at Max. Rate [mMol/$m^2$] | Max. Rate [g/$m^2$ min] | Color Removal [%] |
|---|---|---|---|
| Arquad ® CL8 | 53 | 185.7 | 80 |
| Arquad ® TL8 | 30 | 125.0 | 70 |
| Arquad ® T-50 | 18 | 12.5 | 20 |
| Arquad ® L8 | range | 5.0 | 0 |
| Ethoquad ® C12 | range | 5.0 | 6 |
| Ethoquad ® C25 | range | 4.3 | 3 |

It should be noted that the above wetting rate data was acquired only through use of water as the solvent in depositing the surfactant on the support. The requirement of the invention of a wetting rate greater than 100 g/$m^2$ min., however, is readily applicable to non-aqueous systems, particularly ethanol, in view of the ethanol systems wetting the Accurel® film almost instantaneously, i.e. at a rate greater than 6,000 g/$m^2$ min.

A third primary requirement of the present invention is that the partitioning coefficient of the saccharide solution impurities in the surfactant and solvent deposited on the support, as compared to water, be a certain minimum value. The partitioning coefficient is determined in accordance with Henry's law of partitioning which may be expressed by the formula:

$$K = S_{(1)}/S_{(2)}$$

where, K is the partitioning coefficient, $S_{(1)}$ is the amount of the solute in question retained in a first phase per given volume of first phase, and $S_{(2)}$ is the amount of the solute retained in a second phase in contact with the first phase per same volume of second phase. For purposes of the present invention, the solute is the impurities in the aqueous saccharide solution, primarily phenolics, the first phase is the surfactant and solvent deposited on the support and the second phase is water, i.e. the aqueous saccharide solution.

The following Example V describes the determination of the partitioning coefficient relevant to the present invention.

EXAMPLE V

It was observed that where the surfactant was deposited on the support via an ethanol solution, a typical color removal from an aqueous saccharide solution of 1,000 ICU would be about 74%, or 740 ICU removed, which is equivalent to about 95.5 ppm phenolics. With reference to the glass column of Example III packed with 10 g of Accurel® polypropylene powder, on which the surfactant was deposited with ethanol solvent, the throughput through the column was 14.9 bed volumes or 75 ml (bed volume)×14.9=1117 ml per 10 g. of Accurel®. The amount of ethanol solution that was immobilized (deposited) on the Accurel® was 33.3 ml. This means that 95.5 ppm phenolics were removed from 1117 ml sugar solution and were dissolved in 33.3 ml. of solvent and surfactant. The concentration of phenolics in the effluent solution was thus 260 ICU (1,000 ICU-740 ICU) per 1117 ml., or 33.5 mg/l., and the concentration of phenolics in the solvent-surfactant phase was 95.5 mg. per 33.3 ml., or 3204 mg/l. The calculated partitioning coefficient for 74% color removal is thus:

$$K = 3204/33.5 = 95.6$$

Assuming a color removal of 40%, which for purposes of the instant invention is considered the minimum acceptable, the calculated partitioning coefficient, where ethanol is the solvent, would be 22.3. Therefore, for the purpose of defining the present invention, the minimum partitioning coefficient will be considered to be about 20.

Where the solvent used to deposit the surfactant is water, what is deemed to be the first phase would be only the surfactant itself. The volume of the first phase would therefore be extremely small and the concentration of impurities that would collect in it would be extremely high as compared to the ethanol solvent system. The partitioning coefficient for the above examples where the solvent was water, therefore, would in all cases be extremely high, i.e. much greater than 100, and thus satisfy the partitioning coefficient requirement of the invention of at least 20, but not necessarily the other requirements.

The above Examples III, IV and V serve to define the terms "sorbent bed retention", "wetting rate" and partition-coefficient" and set forth the procedures and test equipment required for the related quantitative measurements. Of course, all tests of such examples were conducted with examples were conducted with polypropylene Accurel®, however, it is believed that any surfactant-solvent combination that satisfies the minimum requirements of sorbent bed retention, wetting rate and partitioning coefficient as stated in the claims, would be completely operable, with regard to removal of impurities from an aqueous saccharide solution, when used with any microporous hydrophobic polymeric support as defined hereinabove.

EXAMPLE VI

This example concerns a study that was made of the relevance of sorbent particle size in the embodiment of the present invention where the aqueous saccharide solution is passed upwardly through columns in series packed with particles of the sorbent.

The first test run employed three glass columns connected in series of about 5 cm I.D., each packed with 200 ml of polypropylene Accurel®. The Accurel® particle size in the first two columns in the series was 250–450 μm and was 30 to 210 μm in the third column. The Accurel® was loaded, in situ, with Arquad® TL8 via an aqueous solvent in all three columns. A 60% sugar solution of 4550 ICU was charged at 45° C. to the first column at the rate of 7.6 B.V. (bed volumes of a single column) per hour until the total throughput reached 14.00 B.V. The second test run was identical, except that the third column in the series was, like the first two columns, also packed with Accurel® of 250–450 μm particle size.

The results of the two test runs are given in Table 6.

TABLE 6

| Accurel ® Sizes, μm | | | Ave, | | % Color | % |
|---|---|---|---|---|---|---|
| Column A | Column B | Column C | Temp, °C. | ΔP, atm | Removal | Turbidity Removal |
| 250~450 | 250~450 | 30~210 | 45 | 2.0 | 81.6 | 63 |
| 250~450 | 250~450 | 250~450 | 45 | 0.3 | 79.0 | 37 |

The results of Table 6 indicate that improved color and turbidity removal is obtained with the finer sorbent particle size in the last column in the series, but at the expense of a large pressure drop, about 80% of which is across the last column. The last column in that instance apparently, in view of the large pressure drop, also serves to strain particulate matter from the sugar solution. It is important to note that a turbidity removal of only 37% still resulted in a product less turbid than that obtained with ion exchange resins.

EXAMPLE VII

A test run employing apparatus and sorbent identical to that of Example VI, except for 250–450 μm sorbent particle size in all three columns, was carried out to study the effect of flow rate on color removal. The results are given in Table 7.

TABLE 7

| Flow Rate B.V./Hr. | Max. Col. Temp. °C. | Color Removal % |
|---|---|---|
| 7.6 | 57.2 | 73.0 |
| 7.6 | 58.5 | 75.0 |
| 7.6 | 59.7 | 76.0 |
| 7.6 | 65.8 | 75.0 |
| 15.0 | 66.7 | 73.5 |
| 15.0 | 65.6 | 73.0 |
| 25.0 | 64.7 | 74.0 |
| 25.0 | 65.0 | 76.0 |
| 25.0 | 65.0 | 75.0 |
| 41.9 | 65.0 | 71.0 |

The variance in column temperature is not believed to have affected the extent of color removal one way or another.

The results of Table 7 are no less than astounding. The affect on color removal of increasing the flow rate through the beds over five fold was almost negligible. This may be contrasted with the above discussed process for removing color bodies from sugar solutions that employ ion exchange resins. In those processes one might expect a maximum flow rate of about 3 B.V./hour in order to avoid an unacceptably turbid product.

It should also be considered that the prior art color removal processes that employ ion exchange resins are not capable of dealing directly with chargestocks of as high as 2000 ICU, which the present invention takes in stride without loss in performance. In fact the process of the present invention has been observed effective for chargestocks as high as 10,000 ICU. The prior art processes would require some kind of an initial step, such as carbon bed treatment, for reducing the color body content to a level they could manage.

EXAMPLE VIII

The purpose of this example is to describe how regeneration was accomplished of sorbents that were heavily loaded with impurities removed from aqueous saccharide solutions by the sorbents.

One sorbent comprised Accurel® on which the surfactant (Arquad® T-50) was deposited by means of a solvent comprising ethanol. The column was first flushed with 2 B.V. of ethanol. This was followed by flushing with 2 B.V. of water. The flushing rate in all cases was about 40 B.V. per hour and at the same temperature as the preceding decolorization step. Reloading of the surfactant was accomplished by circulating a solution of the surfactant and ethanol (0.1 gm surfactant per gram ethanol) for 15 minutes at ambient conditions. The beds were then drained and flushed with at least one bed volume of water. The loading and flushing streams were passed through the sorbent bed at about 40 B.V./hour. The ratio of surfactant to Accurel® obtained was 0.169 gm per gm.

A second sorbent comprised Accurel® on which the surfactant (Arquad® TL8) was deposited by means of an aqueous solution. The sorbent bed was first flushed with 2.5 B.V. of water to remove the saccharide from the bed. The bed was next flushed with 1.5 B.V. of a solution comprising water containing 5 wt. % NACl and 0.2 wt. % NaOH. The bed was then rinsed with 2.5 B.V. of water. Reloading of the surfactant was accomplished by circulating a solution of the surfactant in water (0.015 gm surfactant per gm water) through the bed for 15 minutes at ambient conditions. The beds were then drained and flushed with about 1 B.V. of water. The ratio of surfactant to Accurel® obtained in the sorbent was 0.08 gm per gm.

We claim:

1. A sorbent suitable for the removal of impurities comprising phenolics, dextrans and amino nitrogen from an aqueous saccharide solution comprising a cellular or isotropic microporous hydrophobic polymeric support having pores from about 0.1 to about 50.0 micron average pore diameter and comprising a synthetic hydrophobic thermoplastic polymer selected from the group consisting of aliphatic olefinic polymers on the surface of which support a cationic nitrogenous surfactant has been deposited, the molecules of which surfactant contain at least one alkyl group of at least 8 carbon atoms, the depositing of said surfactant on said support having been effected by contacting said support with a solution of said surfactant in a solvent which is completely miscible with said aqueous saccharide solution, the solution of said surfactant in said solvent having a sorbent wetting rate of at least 100 $g/m^2.min.$, and a sorbent bed retention of at least 140% based on the bed interstitial volume, and the partitioning coefficient of said impurities in said surfactant deposited on said support, as compared to in water, being at least 20.

2. The sorbent of claim 1 wherein said cellular or isotropic microporous polymeric support comprises a plurality of substantially spherical cells having an average diameter from about 0.5 to about 100 microns, distributed substantially uniformly throughout the support, adjacent cells being interconnected by pores smaller in diameter than said spherical cells, the ratio of the average cell diameter to the average pore diameter being from about 2:1 to 200:1, said pores and said cells being void.

3. The sorbent of claim 1 wherein said cellular or isotropic microporous polymeric support is characterized by a C/P ratio of from about 2 to about 200, an S value of from about 1 to about 30, and an average cell size from about 0.5 to about 100 microns, C being the average diameter of cells, P being the average diameter of the pores and S being the sharpness factor.

4. The sorbent of claim 1 wherein said cellular or isotropic microporous polymeric support is characterized by an average pore diameter of from about 0.1 to about 5 microns and an S value of from about 1 to about 10, S being the sharpness factor.

5. The sorbent of claim 1 wherein said surfactant comprises a quaternary ammonium salt of the formula:

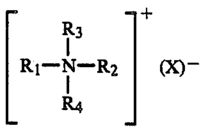

where $R_1$ is selected from the group consisting of hydrocarbons containing from 8 to about 24 carbon atoms per molecule, $R_2$ is selected from the group consisting of hydrocarbons containing from 1 to about 18 carbon atoms per molecule and the alcohols thereof, $R_3$ and $R_4$ are independently selected from the group consisting of $CH_3$ and $(CH_2CH_2O)_nH$ where n for both $R_3$ and $R_4$ totals from 2 to 50, and X is any anion that forms stable salt with the quaternary cation.

6. The sorbent of claim 5 wherein $R_2$, $R_3$ and $R_4$ are methyl groups, $(X)^-$ is the chloride or methylsulfate radical and said solvent comprises ethanol.

7. The sorbent of claim 5 wherein $R_1$ is an alkyl group of from 8 to 18 carbon atoms, $R_2$ is 2 ethylhexyl, $R_3$ and $R_4$ are methyl, $X^-$ is chloride or methylsulfate and said solvent comprises water.

8. The sorbent of claim 1 wherein said surfactant comprises an alkyl propylene diamine.

9. A sorbent suitable for the removal of impurities comprising phenolics, dextrans and amino nitrogen from an aqueous saccharide solution comprising a cellular or isotropic microporous hydrophobic polymeric support having pores from about 0.1 to about 50.0 micron average pore diameter and comprising a synthetic hydrophobic thermoplastic polymer selected from the group consisting of aliphatic olefinic polymers, on the surface of which support has been deposited a quaternary ammonium salt of the formula:

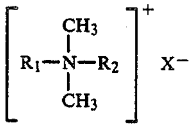

where $R_1$ and $R_2$ each independently comprises an alkyl group of from 8 to 18 carbon atoms and $X^-$ is chloride or methylsulfate, said quaternary ammonium salt being deposited on the pores of said support.

10. The sorbent of claim 9 wherein $R_2$ is the 2-ethylhexyl group.

11. The sorbent of claim 9 wherein said cellular or isotropic microporous polymeric support comprises a plurality of substantially spherical cells having an average diameter from about 0.5 to about 100 microns, distributed substantially uniformly through out the support, adjacent cells being interconnected by pores smaller in diameter than said spherical cells, the ratio of the average cell diameter to the average pore diameter being from about 2:1 to about 200:1, said pores and said cells being void.

12. The sorbent of claim 9 wherein said cellular microporous polymeric support is characterized by a C/P ratio of from about 2 to about 200, an S value of of from about 1 to about 30, and an average cell size from about 0.5 to about 100 microns, C being the average diameter of cells, P being the average diameter of the pores and S being the sharpness factor.

13. The sorbent of claim 9 wherein said microporous polymeric support is isotropic and is characterized by an average pore diameter of from about 0.1 to about 5 microns and an S value of from about 1 to about 10, S being the sharpness factor.

* * * * *